April 15, 1924.
A. E. FORSYTH
1,490,770
FERTILIZER DISPENSING MECHANISM
Filed June 12, 1922     3 Sheets-Sheet 1
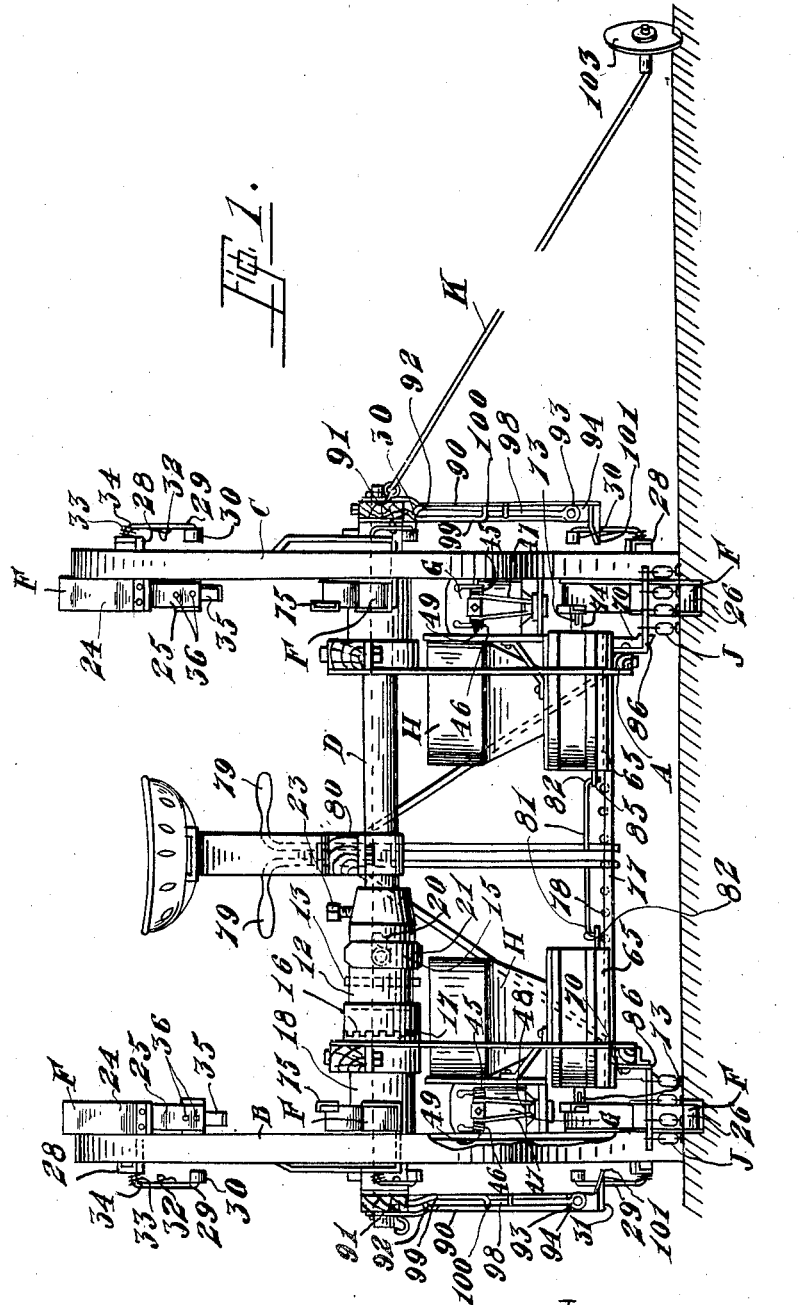
INVENTOR
ALBERT E. FORSYTH
BY Fetherstonhaugh & Co.

April 15, 1924.
A. E. FORSYTH
1,490,770
FERTILIZER DISPENSING MECHANISM
Filed June 12, 1922   3 Sheets-Sheet 2
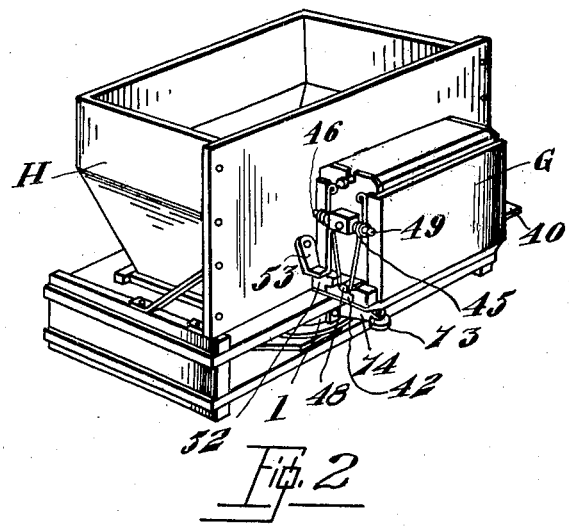
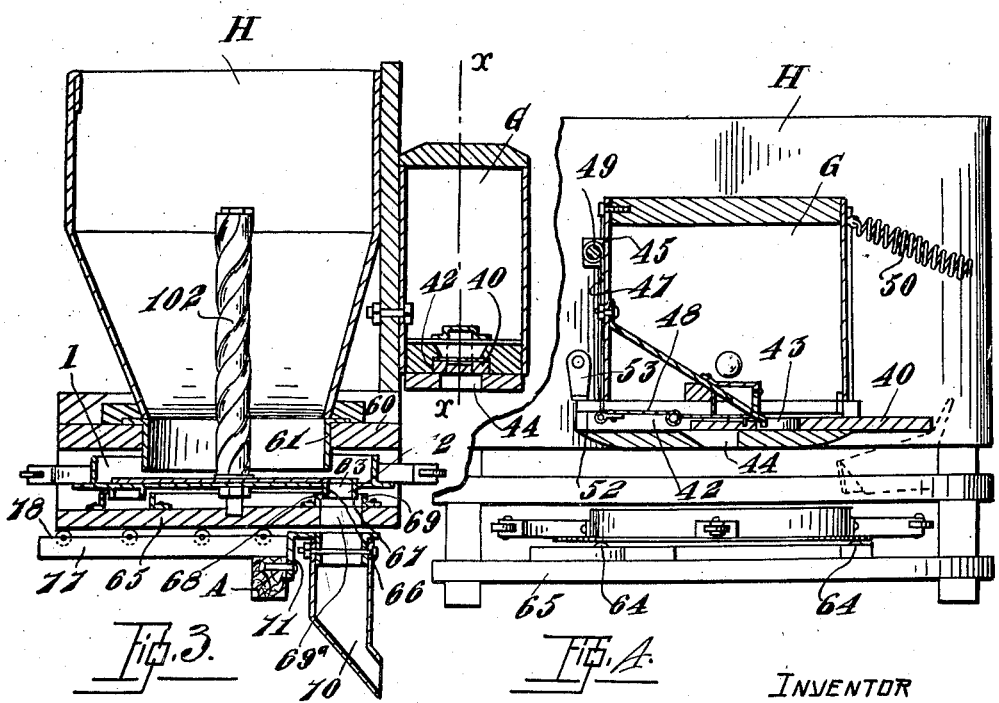
INVENTOR
ALBERT E. FORSYTH
BY Fetherstonhaugh & Co.

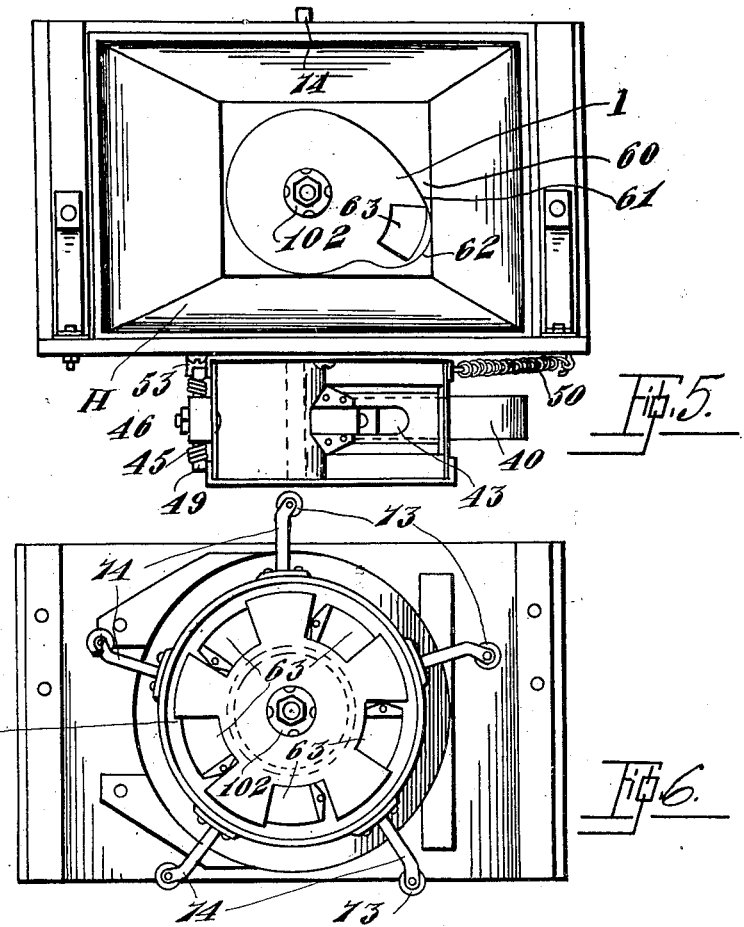

Patented Apr. 15, 1924.

1,490,770

UNITED STATES PATENT OFFICE.

ALBERT EDWIN FORSYTH, OF BELLAMY, ONTARIO, CANADA.

FERTILIZER-DISPENSING MECHANISM.

Application filed June 12, 1922. Serial No. 567,878.

*To all whom it may concern:*

Be it known that I, ALBERT EDWIN FORSYTH, a subject of the King of Great Britain, and resident of the town of Bellamy, Province of Ontario, and Dominion of Canada, have invented certain new and useful Improvements in Fertilizer-Dispensing Mechanism, of which the following is a specification.

This invention relates to improvements in corn planters, and the objects of the invention are to provide simple and effective means for discharging the corn in regulated quantities, and further to provide a machine which will distribute with the corn a certain quantity of fertilizer as required. Further objects are the provision of a device of this character constructed of simple and few parts, all well designed to perform the functions required of them.

Figure 1 is a rear elevation of an embodiment of my invention.

Figure 2 is a perspective view of the fertilizer hopper and seed box.

Figure 3 is a cross sectional view through the fertilizer hopper and seed box.

Figure 4 is a longitudinal sectional elevation through the seed box, taken on the line *x—x*, Figure 3.

Figure 5 is a plan view of the fertilizer hopper and the seed box.

Figure 6 is a plan view of the distributing member for the fertilizer with the hopper removed.

Figure 7 shows the same view as Figure 6 with the distributing member removed, showing the supporting track and rollers for the same.

The seed is fed to the upper pocket 25 from the seed box G. (See Figures 2, 3 and 4.) This seed box includes suitable seed feeding mechanism as hereinafter described. This seed feeding mechanism includes a reciprocable controlling slide 40 mounted within a guideway 42, the guideway and slide having openings 43 and 44 designed to register at a certain point to permit the passage of the seed corn. The guideway is spring-held in normal position by suitable means, the means of which I have devised comprising spiral springs 45 and 46, having projecting ends 47 connected to a link 48, which is pivotally connected to the slide 40. The spiral springs are mounted on pins 49 on the side of the seed box. The springs are thus designed to return the slide 40 to normal position when moved therefrom. The opposite end of the slide to that connected to the springs projects from the end of the seed box, and is designed to be successively engaged and moved by the tappet member carried by the seed pockets on the machine.

To prevent dislodgment of the seed box on retrograde movement of the machine, the seed box is pivotally connected to the hopper H and is retained in normal position by means of a spring 50 extending from the seed box to the hopper and which holds a projection 52 on the seed box against a suitable projection or bracket 53 on the hopper. This arrangement permits the projections 52 and 53 to be separated and the seed box turned on its pivotal point to move the end of the slide 40 in such a position that it will be engaged and operated by the tappet member 35.

The fertilizer hopper H has associated with it, means for feeding the fertilizer. (See Figures 2, 3, 4, 5, 6 and 7.) The bottom 60 of the hopper is formed with an irregularly shaped opening 61 having a projecting side portion 62 designed to register with one of a series of openings 63 formed in a rotary distributing member 1, which distributing member is provided with a series of such openings uniformly spaced in annular arrangement, the distributing member, as a whole, being supported by a plurality of rollers 64 which are mounted on a base-board 65 and engage the underside of the rotary member.

To prevent any escape of the fertilizing material, annular flanges 66 and 67 are formed on the underside of the member 1, fitting closely to corresponding flanges 68 and 69 formed on the base-board, the base-board at one point being formed with a discharge opening 69ª which opens into a discharge spout 70 connected by a bracket 71 with the frame A. The sides of the openings 63 are protected by side flanges 72, whereby the space beneath the opening 63 constitutes a pocket for the conveyance of the fertilizing material from the hopper H to the discharge chute 70.

Movement of the member 1 is effected intermittently by means of rollers 73 carried on radially extending arms 74 secured to the member 1, the rollers being designed to be engaged and operated at intervals by tappet members carried on a suitable bracket, or on any other convenient part of the wheel, the arrangement being such that the tappet member in passing the hopper H will move it a distance to correspond with the distance between the pockets in the member 1, whereby the contents of one pocket will be discharged through the discharge chute 70.

To enable the pivotal point to which the fertilizer is adjusted, or to enable the fertilizer hopper to be moved inwardly so that the rollers will not engage with the tappet member 75, the fertilizer hoppers are laterally adjustable, which is provided for by mounting the base-board 65 on a guideway 77, which may have rollers 78 to support the base-board and hopper. Inward movement of each hopper in the hold is caused to take place by means of a hand lever mounted in the member of the frame, crank-connected at its lower end to the base board.

As many changes could be made in the above construction, and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. Fertilizer distributing means of the character described comprising a hopper formed with an irregular opening provided with a projecting side portion, a rotary distributing disc member mounted in said hopper and provided with a series of annularly arranged openings adapted to individually register in turn with said hopper opening, annular flanges on the underside of the distributing member adapted to register with flanges on the base-board of the hopper, a discharge opening in the base-board and spout means connected to said opening, the openings in the distributing member being formed with flanges designed, in combination with said base board to form pockets, means for rotating and operating the distributing member comprising a plurality of radially extending and spaced arms on the distributing member provided with rollers and designed to be engaged in turn by tappet means on the machine, and means for laterally adjusting the hopper comprising guideways in the machine frame, and lever means carried by the machine, and crank-connected to the base-board for moving the hopper longitudinally inwardly and outwardly.

2. In fertilizer dispensing mechanism substantially as described, the combination, with a hopper having an irregular opening in the base, of a single rotatable distributing member operatively mounted below the bottom of the hopper, a plurality of annular openings in said member designed to register, in turn, with the hopper opening, a base-board and flange means on said base-board adapted to register with the flange means on the distributing member whereby the fertilizer material is prevented from escaping, a discharge opening in the base-board adapted to register individually with the openings in the distributing member, side protecting means for the distributor openings whereby the space therebeneath is designed to form a pocket to convey material to the discharge opening, means for operating the distributing member comprising radially extending and spaced arms adapted to intermittently engage with means carried by the machine.

In witness whereof I have hereunto set my hand in the presence of two witnesses.

ALBERT EDWIN FORSYTH.

Witnesses:
EDWARD MORTON SMITH,
DANIEL GEORGE PEAT.